(12) United States Patent
Voorhees et al.

(10) Patent No.: US 6,352,040 B1
(45) Date of Patent: Mar. 5, 2002

(54) MOBILE ARMORED INCINERATOR

(76) Inventors: Randall P. Voorhees, P.D.I. Inc., R.R. # 1 Box 427, Falls, PA (US) 18615; Joseph E. Voorhees, P.O. Box 84, Lake Winola, PA (US) 18625

( * ) Notice: Subject to any disclaimer, the term of this patent is extended or adjusted under 35 U.S.C. 154(b) by 48 days.

(21) Appl. No.: 09/717,360

(22) Filed: Nov. 22, 2000

(51) Int. Cl.[7] .................................................. F23G 7/00
(52) U.S. Cl. ........................ 110/237; 110/241; 110/211
(58) Field of Search ................................. 110/216, 215, 110/322, 235, 236, 237, 240, 241, 205, 211, 210; 310/50, 52, 53, 54, 58

(56) References Cited

U.S. PATENT DOCUMENTS

| | | | |
|---|---|---|---|
| 2,985,120 A | | 5/1961 | Brandt et al. |
| 3,561,377 A | * | 2/1971 | Amundsen ..................... 110/8 |
| 3,566,809 A | * | 3/1971 | Cary ............................. 110/8 |
| 3,780,675 A | * | 12/1973 | Frye et al. ................... 110/8 E |
| 3,882,800 A | | 5/1975 | du Chambon |
| 3,938,450 A | | 2/1976 | Jaronko et al. |
| 4,395,958 A | * | 8/1983 | Caffyn et al. ............... 110/246 |
| 4,627,365 A | | 12/1986 | Tseng |
| 4,852,815 A | | 8/1989 | Giannotti |
| 4,875,420 A | * | 10/1989 | Hay et al. ................... 110/215 |
| 5,022,329 A | | 6/1991 | Rackley et al. |
| 5,237,938 A | | 8/1993 | Fujimori et al. |
| 5,331,106 A | | 7/1994 | Spas |
| 5,423,271 A | | 6/1995 | Schulze |
| 5,495,063 A | | 2/1996 | Magenheimer et al. |
| 5,695,723 A | * | 12/1997 | Valentino ..................... 422/177 |
| 5,727,481 A | | 3/1998 | Voorhees et al. |
| 5,741,465 A | | 4/1998 | Gregg |
| 5,743,196 A | | 4/1998 | Beryozkin et al. |
| 5,799,591 A | | 9/1998 | Anderson |
| 5,809,909 A | * | 9/1998 | Hoskinson ................... 110/215 |
| 5,881,654 A | | 3/1999 | Fleming et al. |

FOREIGN PATENT DOCUMENTS

| | | |
|---|---|---|
| CA | 2057621 | 11/1995 |
| DE | 38 14 723 A1 | 11/1988 |
| DE | 40 37 919 A1 | 5/1992 |
| JP | 4-20705 | 1/1992 |
| JP | 6-265122 | 9/1994 |

* cited by examiner

Primary Examiner—Denise L. Esquivel
Assistant Examiner—K. B. Rinehart
(74) Attorney, Agent, or Firm—Richard C. Litman

(57) ABSTRACT

A mobile armored incinerator apparatus on a trailer which can be driven to a site to burn explosive materials safely to eliminate noxious particulates and liquids. A primary combustion chamber has a rectangular shape with an internal telescoping loading cart. A secondary combustion chamber having a cylindrical shape is connected to the primary combustion chamber by a dust and as ash separator unit or duct which has baffles and air jets for separating ash particles from the exhaust exiting from the first chamber. The secondary combustion chamber then completes the combustion of the exhaust gases. The hot parts of the apparatus are made touchable with an aluminum sheeting shell.

9 Claims, 4 Drawing Sheets

MOBILE ARMORED INCINERATOR

BACKGROUND OF THE INVENTION

1. Field of the Invention

The present invention relates generally to incinerators. More specifically, the invention is a mobile armored incinerator having three stages for burning explosive materials.

2. Description of the Related Art

The related art of interest describes various incinerators, but none discloses the present invention. There is a need for a mobile armored incinerator which can be towed to facilities to incinerate explosive materials with maximum security and minimum toxic effluent. The related art will be discussed in the order of perceived relevance to the present invention.

U.S. Pat. No. 5,727,481 issued on Mar. 17, 1998, to Randall P. Voorhees et al. describes a portable armored incinerator for burning explosive material comprising a primary combustion chamber having armored walls and a loading cart mounted on telescoping rails, and a secondary combustion chamber mounted on a trailer The present invention is an improvement separating the combustion chambers with an interacting duct to form three separate stages.

U.S. Pat. No. 5,799,591 issued on Sep. 1, 1998, to Berris M. Anderson describes an incinerator for burning medical waste in a self-contained unit comprising a hopper over a fire chamber connected to a scrubber tank supported on a wheeled conveyor mechanism which is connected to water and gas supply sources. The incinerator is distinguishable for its required scrubber apparatus based on a water supply.

U.S. Pat. No. 5,495,063 issued on Feb. 27, 1996, to Hans E. Magenheimer et al. describes a process for destruction of pyrotechnic material in a controlled manner, wherein the slag is allowed to continue reacting in a tube reactor without an internal lining, the crude gas formed is passed through a 1200° C. region and cooled by heat exchangers to below 400° C., a preliminary multicyclone separator removes coarse particles, the gas passes through a series of fine dust filters, and the cleaned gas is released into the environment. The process and apparatus required is distinguishable for its unlined tube reactor and extensive array of filtering apparatus.

U.S. Pat. No. 5,743,196 issued on Apr. 28, 1998, to Vladimir Beryozkin et al. describes a mobile waste incinerator mounted on a truck having a connected receiving chamber, a preparation chamber, and an incineration chamber. The receiving chamber preheats the waste with recycled exhaust gases. The preparation chamber has small and large cutting blades for reducing the size of the waste. Each chamber is inclined up with the middle chamber being rotatable to 45°. The apparatus is distinguishable for its hopper system and rotating cutter blades.

U.S. Pat. No. 5,022,329 issued on Jun. 11, 1991, to John M. Rackley et al. describes a cyclone furnace for vitrifying inorganic hazardous materials containing heavy metals from waste containing organic materials. The inorganic hazardous material is retained and vitrified in the slag layer of a cyclone furnace and converted to a non-leachable, inert form for safe disposal, and the organic hazardous materials are completely destroyed. The apparatus is distinguishable for utilizing a cyclone furnace.

U.S. Pat. No. 5,331,106 issued on Jul. 19, 1994, to Stanley E. Spas describes the treatment of solid rocket propellant to reclaim valuable aluminum particles and extracting oxidizer by hydromining for reuse. The remaining solids are incinerated to recover aluminum oxide. The incinerator apparatus is distinguishable for its operation only on aluminum and binder material.

U.S. Pat. No. 5,423,271 issued on Jun. 13, 1995, to Walter Schulze describes a furnace employing incineration trays for burning away explosive substances. The apparatus is distinguishable for employing trailing incineration trays.

U.S. Pat. No. 5,741,465 issued on Apr. 21, 1998, to Ronald E. Gregg describes a reactive waste deactivation facility processing hazardous waste comprising a building having an outer perimeter of deactivation bays surrounding expansion chambers which are connected to an air pollution control system. The facility is distinguishable for requiring separate deactivation bays and expansion chambers.

U.S. Pat. No. 5,881,654 issued on Mar. 16, 1999, to Jeff L. Fleming et al. describes a combustion apparatus for thermal treatment of energetic materials comprising a containment system which maintains an interface between hot exhaust gas and a cooler gas. The apparatus is distinguishable for its reliance on an interface between hot and cool gases.

The following patents were cited in U.S. Pat. No. 5,727,481 discussed above.

U.S. Pat. No. 2,985,120 issued on May 23, 1961, to John B. Brandt et al. describes an unarmored mobile incinerator lacking explosion hatches.

U.S. Pat. No. 3,882,800 issued on May 13, 1975, to Michel G. J. du Chambon describes an unarmored automotive unit having a rotary furnace with an endless screw for loading.

U.S. Pat. No. 3,938,450 issued on Feb. 17, 1976, to John C. Jaronko et al. describes an apparatus having a wheeled chassis carrying a hopper, shredder and fan for directing air and refuse to a cylindrical member where the refuse is incinerated.

U.S. Pat. No. 4,627,365 issued on Dec. 9, 1986, to Juoyuan Tseng describes a mobile garbage incinerator with a hanging drum for lifting and dumping garbage into a collecting tank from which the garbage is removed to a main incinerating room, and then to a secondary incinerating room.

U.S. Pat. No. 4,852,815 issued on Aug. 1, 1989, to Hugo V. Giannotti describes an in transit resource recovery system including a motor vehicle having means for bag-ripping, sorting, shredding, pre-heating and pre-volatilizing, classifying, incineration, and gas clean-up, and containing bins for collection of recyclable items and ash.

U.S. Pat. No. 5,237,938 issued on Aug. 24, 1993, to Minoru Fujimori et al. describes a medical refuse incinerating vehicle having a main furnace and an after-burning furnace with means for injecting lime water in the main furnace.

German Patent Application No. 38 14 723 A1 published or Nov. 11, 1988, for Lutz Niemeyer describes a pyrolysis reactor using a plasma burner and configured with a curved duct for recycling and superimposing a centrifugal force in the reactor. The apparatus is distinguishable for its centrifugal reactor.

Japan Patent Application No. 4-2075 published on Jan. 24, 1992, for Minoru Suzuki describes a mobile incinerator for disposal of medical waste by adding a main combustion burner to an opening and closing door, and including a gun type oil burner which blows the flame into the main combustion chamber. The apparatus is distinguishable for its lack of means for removing particulates.

German Patent Application No. 40 37 919 published on May 27 1992, for Eberhard Weiss et al. describes a process for continuous removal of ammunition propellant and avoiding pollution by mixing with water, shredding, dewatering, and combustion in a fluidized bed. The apparatus is distinguishable for reliance on a fluidized bed for combustion.

Japan Patent Application No. 6-265122 published on Sep. 20, 1994, for Masao Kudo describes a change in the ground height of a pivotable chimney of a mobile incineration processing vehicle having primary and secondary combustion chambers. The apparatus is distinguishable for not requiring a connecting duct having particle separating ability.

Canada Patent Application No. 2,037,621 published on Nov. 14, 1995, for Minoru Fujimori et al. describes a mobile incinerating vehicle for burning medical refuse having a rotary burner with a three-way valve in the main furnace in which air, oil or lime water is injected. An integral afterburning furnace communicates with the main furnace. The apparatus is distinguishable for its integrated structure lacking a particle separating connecting duct.

None of the above inventions and patents, taken either singularly or in combination, is seen to describe the instant invention as claimed. Thus, an armored mobile explosive material burning incinerator apparatus solving the aforementioned problems is desired.

SUMMARY OF THE INVENTION

The present invention is directed to a three-stage mobile incinerator on a trailer which can be driven to a site to burn explosive materials safely to eliminate noxious particulates and liquids. A primary combustion chamber has a rectangular shape with a telescoping loading cart. A secondary combustion chamber having a cylindrical shape is connected to the primary combustion chamber by a dust and ash separator unit or duct which has baffles and air jets for separating ash particles from the exhaust exiting from the first chamber. The secondary combustion chamber then completes the combustion of the exhaust gases.

Accordingly, it is a principal object of the invention to provide an apparatus for safely eliminating explosive toxic materials by incineration.

It is another object of the invention to provide an apparatus for safely eliminating explosive toxic materials by incineration which is easily transported by locating the apparatus on a trailer for transportation to the site having the dangerous materials.

It is a further object of the invention to provide an apparatus for safely eliminating explosive toxic materials by incineration in a three-stage combustion process.

Still another object of the invention is to provide an apparatus for safely eliminating explosive toxic materials by incineration in a three-stage combustion process including a dust and ash separator unit or duct which has baffles and air jets for separating ash particles from the exhaust exiting from the first combustion chamber before entering the second combustion chamber.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
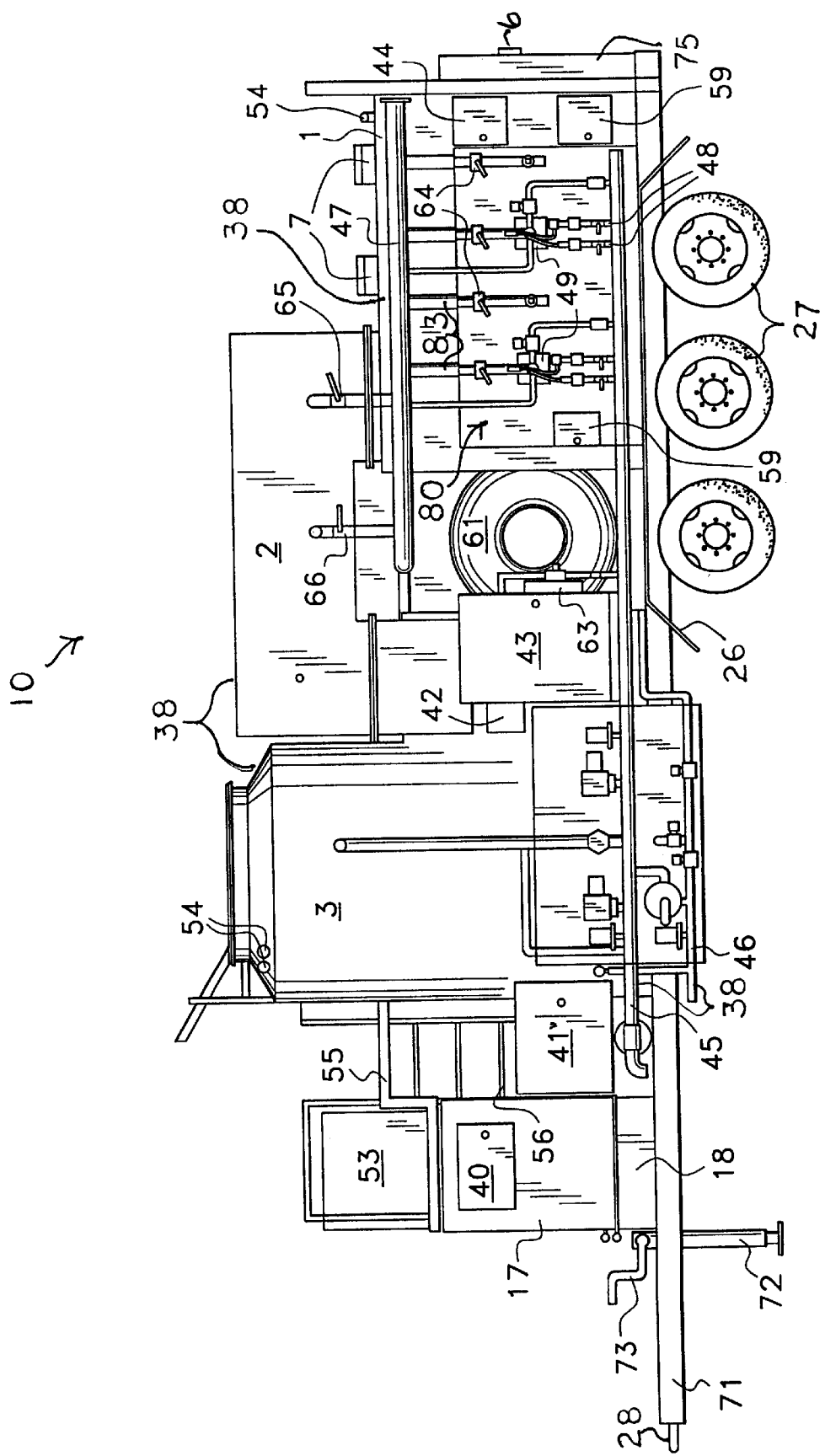
FIG. 1 is a left side, elevational view of the armored mobile incinerator apparatus according to the present invention.
Figure 2:
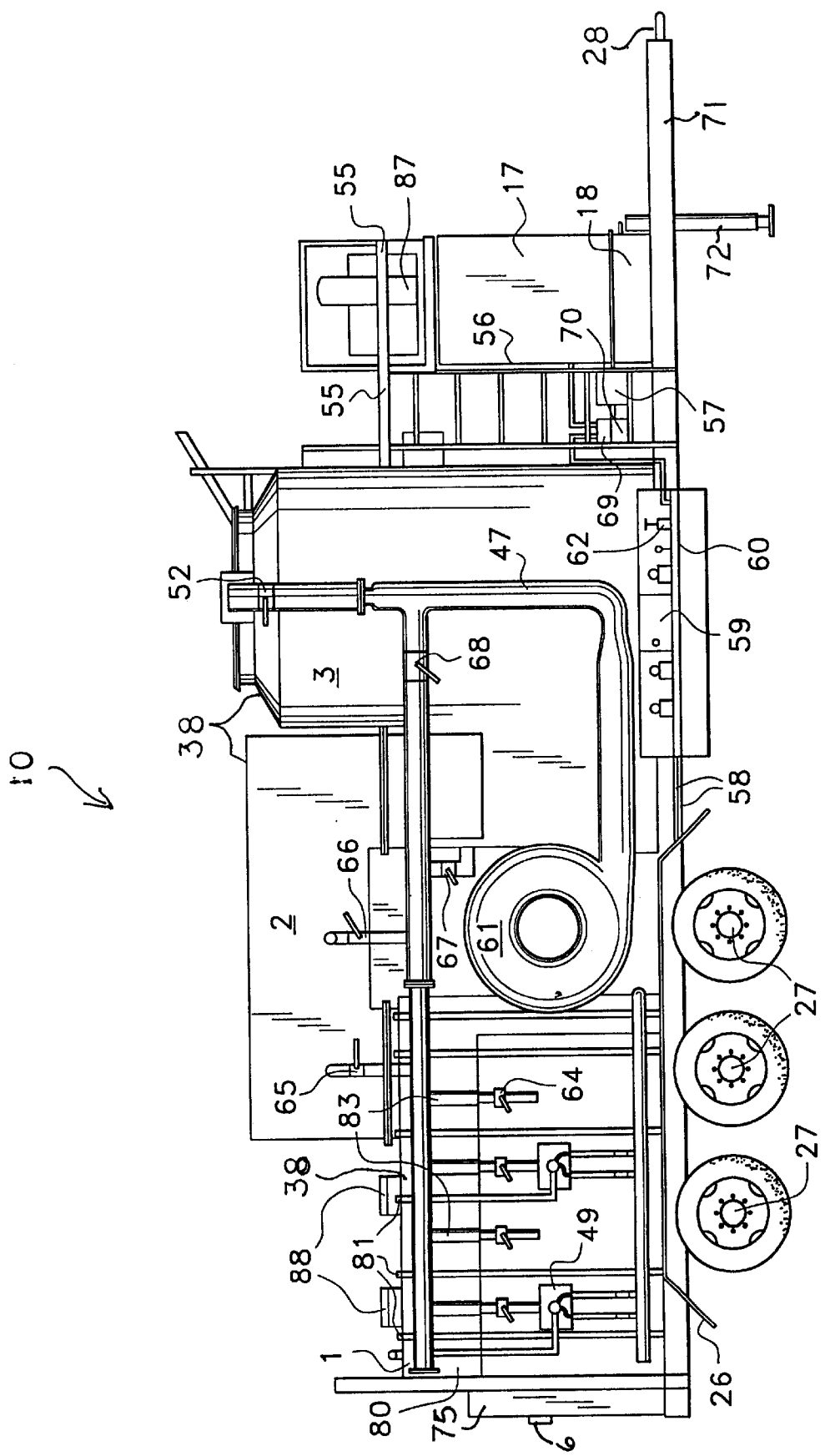
FIG. 2 is a right side, elevational view of the armored mobile incinerator apparatus according to the present invention.

The present invention illustrated in FIGS. 1 and 2 is directed to a mobile armored incinerator apparatus 10 comprising a primary combustion chamber 1 having an internal soft and pliable wall refractory lining, a ram loading unit mounted on telescoping rails (shown in U.S. Pat. No. 5,727,481, the disclosure of which is hereby incorporated by reference), a loading door 75, and armor plated walls 80 reinforced by surrounding external beams 81 (FIG. 2). An interconnecting duct serving as a dust and ash particle unit 2 leads to a secondary combustion chamber 3. The primary and secondary combustion chambers 1 and 3, respectively, are supported by a trailer 71 having a trailer hitch 28, a leveler 72, a crank 73, and triple axles with wheels 27.

In the left side view FIG. 1, a generator operating control panel 40 positioned in the front of apparatus 10 controls the power supply generator 17 fueled by fuel tank 18 and powers the atomizing air compressor 53 (FIGS. 1 and 2) which receives ambient air from the air intake pipe 87 (FIG. 2).

Figure 4:
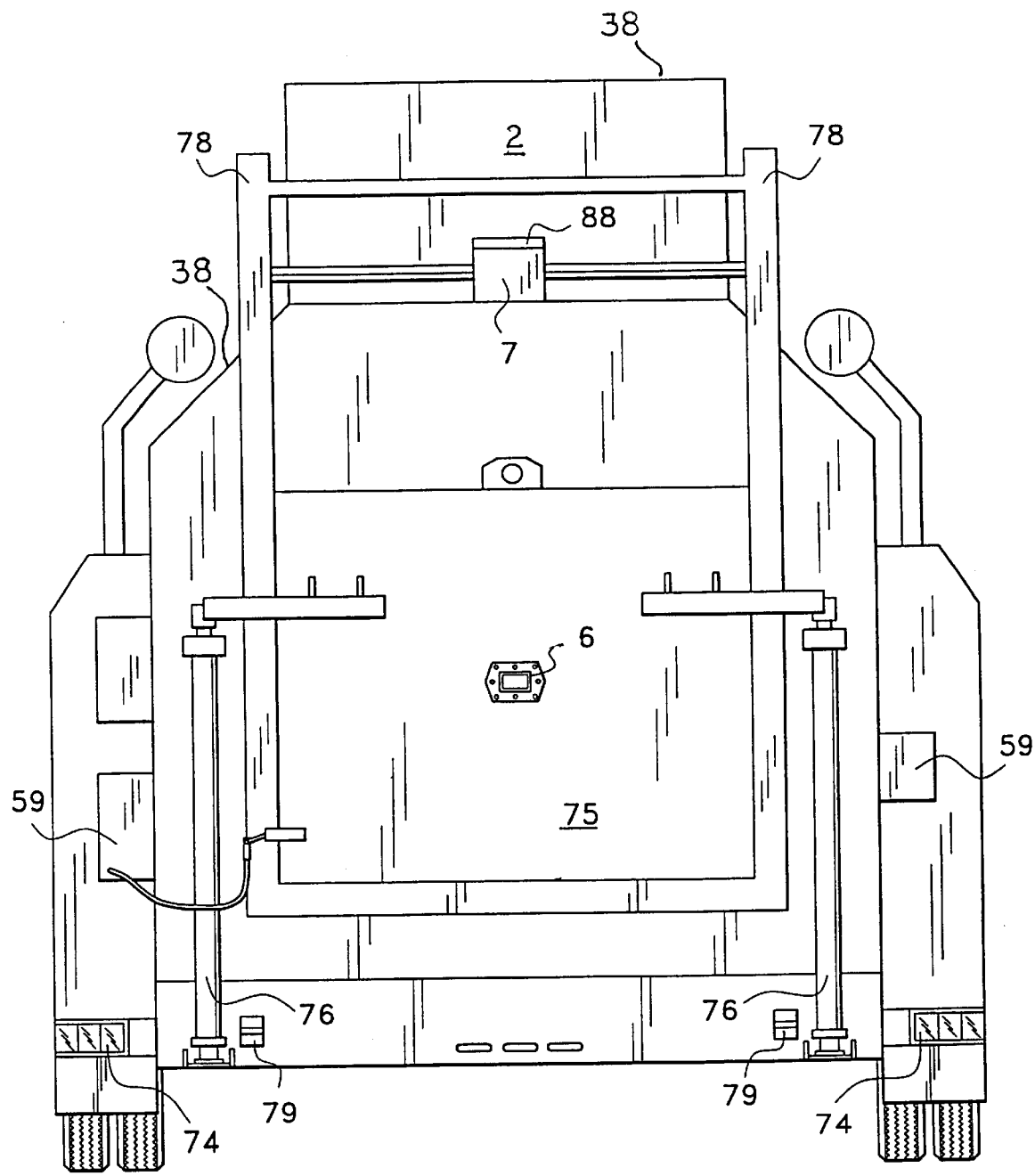
FIG. 4 is a rear elevational view of the armored mobile incinerator apparatus according to the present invention.

With reference to the rear of the apparatus illustrated in FIGS. 1, 2 and 4, the primary combustion chamber 1 is fabricated from armor plate 80, surrounded with beams 81 as mentioned above for an increase in structural integrity to eliminate warpage. The armor plate is preferably fabricated of at least ⅜ inch thick steel plate. The beams 81 are steel channel stock at least 3 inches square in cross-section, weighing 4.1 lbs./ft., and placed in parallel with their centers spaced 16 in. apart. The primary combustion chamber 1 is preferably 8.5 ft. in length, 5.33 ft. in width, and 6 ft. in height. Preferably, all welded joints in the combustion chamber 1 are bevelled at 45°, and all welds are fully penetrated. Inside the chamber 1, steel gussets (not shown) are installed in every corner at 45° angles using continuous welding. These critical reinforcements are deemed necessary to reduce the explosive pressure and eliminate warpage from heat on the corners.

The primary combustion chamber 1 is preferably lined on the inside with a soft and pliable refractory material to effectively absorb heat to avoid overheating the walls and to absorb the explosive shock. The refractory material is preferably a ceramic fiber blanket based material comprising a density range of 6–15 lb./ft., a thickness range of 6–15 in., and which is folded to form bolt-in modules. The modules are further coated with a rigidifying ceramic based material to reduce wear on the modules.

The primary combustion chamber burners 49 (FIGS. 1 and 2) are multi-fuel units which can burn natural gas, liquified propane gas, fuel oil, and various combustible chemical mixtures supplied through supply trains. Preferably, there are four primary burner units ignited by electric spark or gas pilot burners which are controlled by conventional pressure and electrically operated regulator devices and control valves (not shown) which coordinate and control the burning cycles, duration periods and temperature. Cooling air and mixing air vents 83 (FIGS. 1 and 3) allow pressurized air to pass into the primary combustion chamber 1.

The interconnecting duct 2 in FIGS. 1 and 2 for separating the dust and ash issuing from the primary combustion chamber 1 is preferably lined with the same refractory material described for the chamber 1. This unique design consisting of internal baffles and air jets provides an effective method for separating out the ash particles issuing from the primary combustion chamber 1. Exhaust gas flow restricting control valves 66 (FIGS. 1 and 2) are positioned on either side of the duct 2 to control the quantity of air coming into the duct 2 to vary the degree of exhaust gas velocity and the separation of the ash particles.

The secondary combustion chamber 3 is an upright cylindrical tank preferably fabricated from ⅜ in. thick armor plate. The chamber 3 is fueled by a secondary burner 63 (FIG. 1) with the same fuel compositions recited above and designed to burn all the combustible materials in the exhaust gas issuing from the primary combustion chamber 1. Temperature sensors 54 are provided adjacent the top of the chamber 3 for constant temperature measurement.

Combustion chambers 1 and 3, the duct 2, the gas trains 45 and 46, and the power supply generator 17 are covered with a 14 gauge aluminum shell 38. Shell 38 composes the outer skins of these units to allow their outer skin temperatures to remain at safe glove-touchable temperatures.

Adjacent the generator operating control panel 40 in FIG. 1, an air fan's soft start control panel 41 is located for controlling the air flow in the main gas and pilot (smaller diameter pipe) safety interlock supply pipe trains 45 and 46, respectively. Below the dust and ash separator unit 2, a main operating control panel 43 is located containing a 120 V., single phase, 60 Hz. control transformer 42. A combined combustion air, cooling air and ejector air supply fan 61 (FIGS. 1 and 2) supplies combustion air and cooling air supply via pipe train 47 (FIG. 2). A pipe train 48 from the main fuel tank 18 in FIG. 1 supplies the gas or liquid fuel and atomizing air to the primary combustion chamber 1. A plurality of mixing and cooling air nozzles 64 are positioned on both sides of the chamber 1. An overfire air control valve 65 is positioned above the chamber 1. A plurality of pressure release hatches 7 are furnished, preferably with either hinged stops (FIG. 1), rupture type disc units or poppet type lids 88 (FIG. 2). The hatches 7 will open to relieve a predetermined excessive pressure. All units 7 and 88 are constructed of alloy steel having stops or restrictors to limit their travel. An exhaust gas flow restricting control valve 66 is positioned on both sides of the dust and ash separator unit 2 to control the degree of exhaust gas velocity and particulate ash separation.

All burner units 49, 63 are ignited by a high intensity electric spark unit and gas pilot system (not shown). The burners and the heat created in each combustion chamber 1, 3 are controlled independently by digital temperature controllers by either thermocouples or infrared temperature sensors. Typically, the secondary combustion chamber 3 will be operated at higher temperatures to insure complete burning of any exhaust borne vapors and particles issuing from the primary combustion chamber 1. A multi-function forced draft fan 61 (FIG. 2) supplies combustion air to the primary and secondary combustion burner units 49, 63, cooling and mixing air to the cooling and mixing nozzles 54 on top of the primary combustion chamber (FIG. 1), ambient air to the overfire air control valves 65 (FIGS. 1 and 2), operating air to the exhaust gas flow control and separator control valves 66, and pressurized air to a secondary ejector system.

As disclosed in Pat. No. 5,727,481, after the loading door 75 (FIG. 4) is opened, a ram loader mounted on hinged telescoping rails pulls down and outward from the rear of the primary combustion unit 1 for loading the combustible materials. The loading door 75 is fabricated from ⅜ inch thick steel plate and lined on its inside surface with the soft and pliable wall refractory material mentioned above. A high temperature resistant glass viewing port 6 having a door is centered on the door 75 of the primary combustion chamber 1 for viewing the combustion process. A pair of upright door support and guide channel beams 78, a pair of upright hydraulic or pneumatic operating cylinder units 76, and ram loader mounting hinges 79 on the bottom of the door are provided for the primary combustion chamber 1.

Figure 3:
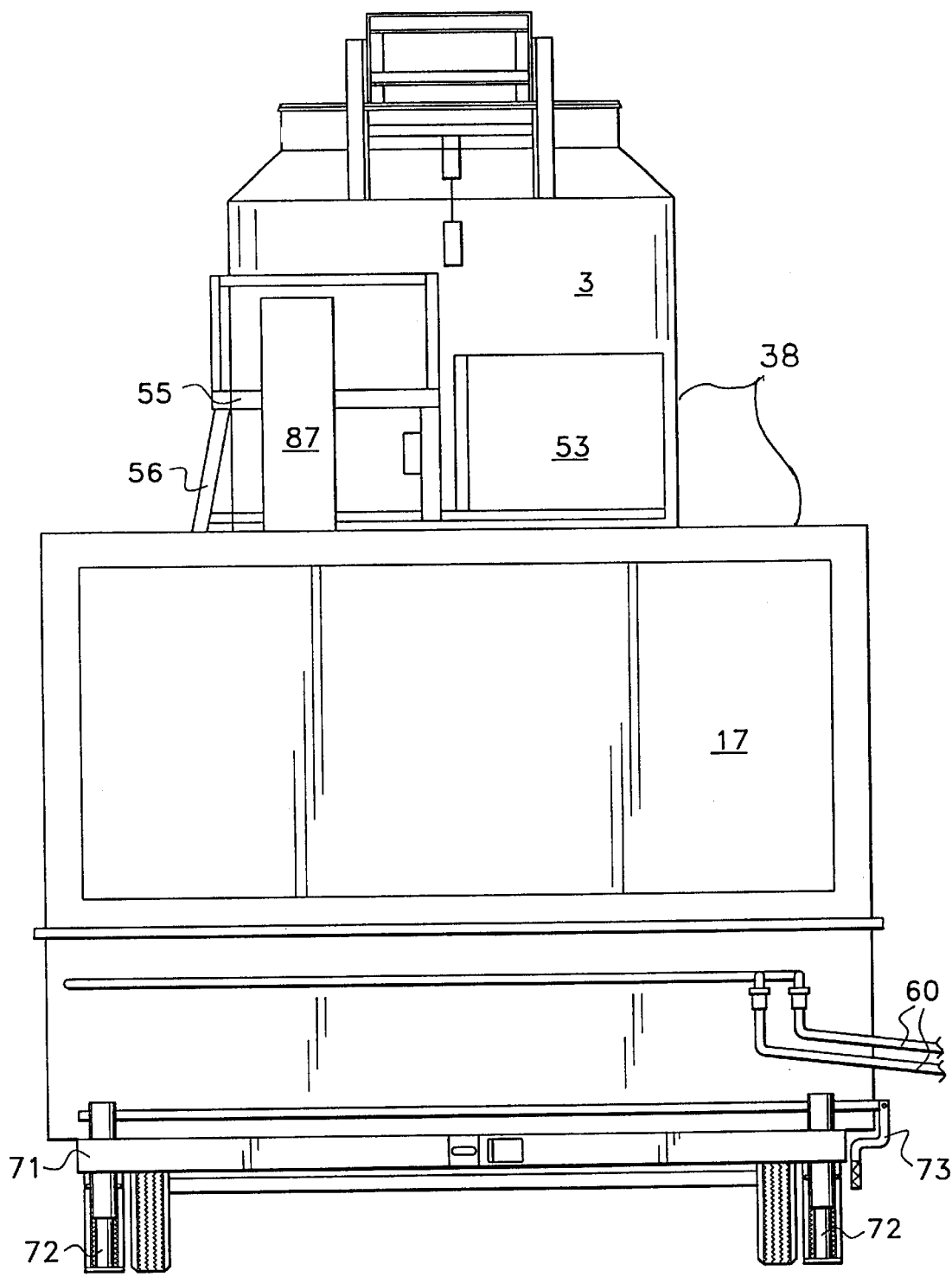
FIG. 3 is a front elevational view of the armored mobile incinerator apparatus according to the present invention.

FIGS. 1, 2 and 3 illustrate the sides and the front end of the trailer 71, respectively, having an inspection and service platform 55; an access ladder 56; liquid fuel pumping units 57 (FIG. 2); liquid fuel and atomizing air safety interlock supply pipe trains 58 (FIG. 2); wiring junction boxes 59 (FIGS. 2 and 4); pilot gas, liquid fuel and atomizing air supply pipe trains 60 (FIGS. 2 and 3); an ejector air control valve 62 (FIG. 2); an air receiver tank 87 (FIG. 3); a secondary combustion air flow control valve 67 (FIG. 2); a primary combustion air cooling flow control valve 68 (FIG. 2); a hydraulic pumping unit 69; and a fuel storage tank 70.

In FIG. 4, the rear lighting and signalling devices 74 of the trailer 71 are wired for 12 volts D.C. supplied by the battery or generator of the vehicle towing the trailer 71 to meet the regulation requirements of the U.S. Department of Transportation.

The trailer 71 is equipped with a surge brake actuator on the front end which can exert a pressure of at least 80,000 p.s.i. for smoother and more responsive braking with heavy loads. The frame of the trailer 71 is constructed with steel channel beams and cross members which are reinforced with triangular gussets. The channel beams are 8 in. square in cross-section and weigh 13.75 lbs./ft. The cross members are 4 in. square in cross-section. The trailer 71 can carry at least 15,000 lbs. with its three axles and wheels 27 covered by fender skirts 26 (FIGS. 1 and 2).

While the incinerator is mounted on a trailer, it is contemplated that the incinerator can be mounted in a motor vehicle or attached to a sled or boat.

It is to be understood that the present invention is not limited to the embodiments described above, but encompasses any and all embodiments within the scope of the following claims.

We claim:

1. A mobile armored incinerator for burning explosive materials comprising:

a primary combustion chamber having pressure release hatches on top with armored walls constructed of steel plates surrounded by steel channel beams, said primary combustion chamber being lined with a refractory material, and wherein combustion of the explosive materials in the primary combustion chamber results in the formation of particulate matter and a gaseous exhaust phase;

a separator duct communicating with said primary combustion chamber and containing internal baffles and air jets for separating the particulate matter from the gaseous exhaust phase;

a secondary combustion chamber communicating with said duct for completing combustion of the gaseous exhaust phase after removal of the particulate matter;

a control system connected to each said combustion chamber in order to control combustion within each said combustion chamber and a generator connected to said control system to supply power to said control system wherein said generator includes an atomizing compressor to supply atomizing air to the primary combustion chamber; and means for transporting said mobile incinerator to a site containing explosive waste materials.

2. The mobile armored incinerator according to claim 1, wherein said pressure release hatches are selected from the group consisting of hinged stop hatches, rupture type disc units and poppet type lids.

3. The mobile armored incinerator according to claim 1, including a plurality of intake nozzles to allow ambient air to pass into said primary combustion chamber and in said separator duct, and an exhaust vent on said secondary combustion chamber through which exhaust gas cleaned of particulate matter exits the mobile incinerator.

4. The mobile armored incinerator according to claim 3, including a draft induction fan to assist movement of ambient air and exhaust through said intake nozzles, said separator duct, and said exhaust vent.

5. The mobile armored incinerator according to claim 3, including a means for delivering flammable fluid to said primary and secondary combustion chambers, and means for igniting said flammable fluid in said primary and secondary combustion chambers.

6. The mobile armored incinerator according to claim 1, wherein said mobile incinerator further includes an exterior shell of aluminum sheeting.

7. The mobile armored incinerator according to claim 1, wherein said means for transporting said mobile incinerator is a trailer on which said mobile incinerator is mounted.

8. The mobile armored incinerator according to claim 7, wherein said trailer includes wheels equipped with hydraulic brakes and a surge brake actuator.

9. The mobile armored incinerator according to claim 7, wherein said trailer includes a leveling device for raising and lowering a front end of said trailer.

\* \* \* \* \*